(12) United States Patent
Keren et al.

(10) Patent No.: US 6,771,362 B2
(45) Date of Patent: Aug. 3, 2004

(54) METHOD AND APPARATUS FOR TESTING AND MAPPING PHASE OBJECTS

(75) Inventors: Eliezer Keren, Omer (IL); Raanan Bavli, Be'er Sheva (IL)

(73) Assignee: Rotlex Ltd., Omer (IL)

(*) Notice: Subject to any disclaimer, the term of this patent is extended or adjusted under 35 U.S.C. 154(b) by 348 days.

(21) Appl. No.: 10/026,951

(22) Filed: Dec. 27, 2001

(65) Prior Publication Data

US 2003/0123054 A1 Jul. 3, 2003

(51) Int. Cl.$^7$ .................................................. G01B 9/00
(52) U.S. Cl. ...................................................... 356/124
(58) Field of Search ................................ 356/124–127, 356/120, 129; 250/237.6

(56) References Cited

U.S. PATENT DOCUMENTS

| | | | |
|---|---|---|---|
| 4,459,027 A | | 7/1984 | Kafri et al. |
| 4,577,940 A | * | 3/1986 | Krasinski et al. ........ 250/237 R |
| 4,639,132 A | * | 1/1987 | Glatt et al. .............. 356/124.5 |
| 4,810,895 A | | 3/1989 | Kafri et al. |
| 4,854,708 A | * | 8/1989 | Kafri et al. ................. 356/512 |
| 5,872,625 A | | 2/1999 | Kajino et al. |
| 6,496,253 B1 | * | 12/2002 | Vokhmin .................... 356/124 |

FOREIGN PATENT DOCUMENTS

JP        60 247133      12/1985

OTHER PUBLICATIONS

Oster et al., "Moiré", *Scientific American*, 208, pp. 54–63, 1963.

Nishijima et al., "Moiré Patterns: Their Application to Refractive Index and Refractive Index Gradient Measurements", *Journal of the Optical Society of America*, vol. 54, pp. 1–5, Jan. 1964.

Benton et al., "Simplified Talbot Interferometers for Lens Testing", *Optical Engineering*, vol. 15, pp. 328–331, Jul.–Aug. 1976.

Bolognini et al., "Interferometry based on the Lau effect a quasi–ray description", *Optica Acta*, vol. 32, pp. 409–422, 1985.

Pirga–et–al., "Two directional spatial–carrier phase–shifting method for analysis of crossed and closed fringe patterns", *Optical Engineering*, pp. 2459–2466, vol. 34, Aug. 1995.

Morimoto et al., "Application of moire analysis of strain using Fourier transform", *Optical Engineering*, pp. 650–656, vol. 27, Aug. 1988.

Keren et al., "An Optical Method for Mapping the Power and Cylinder of Multifocal Progressive Lenses", *Ophthalmic & Visual Optics/Noninvasive Assessment of the Visual System Technical Digest*, vol. 3, PD1–1 through PD1–4, 1983.

Sciammarella et al., "Digital–filtering Techniques Applied to the Interpolation of Moiré–fringes Data", *Experimental Mechanics*, pp. 468–475, Nov. 1967.

* cited by examiner

*Primary Examiner*—Michael P. Stafira
(74) *Attorney, Agent, or Firm*—Nixon & Vanderhye P.C.

(57) ABSTRACT

A method for measuring the optical parameters of a phase object, comprising recording a moiré pattern viewed through said phase object, said moiré pattern being formed by illuminating by means of a source of diffuse light, first and second gratings positioned in the space between said light source and said phase object, wherein the plane of said first grating is parallel to the plane of said second grating, and calculating the optical parameters of interest from said moiré pattern.

18 Claims, 11 Drawing Sheets

METHOD AND APPARATUS FOR TESTING AND MAPPING PHASE OBJECTS

FIELD OF THE INVENTION

The present invention relates to a method and apparatus for measuring the optical parameters of phase objects. Specifically, the present invention provides a method and an apparatus that utilize the moiré effect, for determining the properties of various phase objects, particularly lenses.

BACKGROUND OF THE INVENTION

Moiré patterns are generated whenever there is overlap between two periodic structures consisting of alternating transparent and opaque regions. For example, a simple moiré pattern is observed when two sets of equally spaced straight lines are superimposed on one another such that a small angle exists between the lines of the two sets.

The art suggests a variety of technical and scientific applications based on the moiré effect, including the use of said effect for determining the optical features of lenses.

Oster et al. [Scientific American 208, p. 54–63 (1963)] and Nishijima et al. [Journal of the Optical Society of America, 54(1), p. 1–5 (1964)] disclose the use of the moiré effect for testing lenses. According to the methods described in these publications, the lens is interposed between two gratings exhibiting the moiré pattern. The presence of the lens alters the moiré pattern observed, the degree and nature of the alternation being related to the focal length of the lens.

Benton et al. [Optical Engineering, 15(4), p. 328–331, (1976)], describe an interferometer for lens testing that is based on the moiré effect. The device comprises a point source and a pair of gratings, the lens to be tested being placed in front of the first grating.

Bolognini et al. [Optica Acta., 32(4), p. 409–422(1985)] describe interferometry based on the Lau effect. According to the optical arrangements discussed in the paper, the lens under test is positioned in the space between the gratings.

U.S. Pat. No. 4,459,027 discloses a method and an apparatus for mapping an optical object, using the moiré effect. The critical characteristic of the arrangement according to U.S. Pat. No. 4,459,027 is that collimated rays pass through the lens to be tested. This is accomplished by using coherent light, which in practice is provided by a laser point source, and by introducing means for collimating said light to produce collimated rays therefrom. The object to be tested, that is, the lens, is placed in the path of said collimated rays prior to reaching two gratings capable of generating a moiré pattern. The moiré pattern observed is analyzed in order to derive the optical parameters of the lens therefrom.

It is an object of the present invention to provide an efficient optical arrangement for measuring the properties of phase objects, particularly lenses, using simple and low-cost equipment.

It is another object of the present invention to provide an optical arrangement for measuring the properties of phase objects, utilizing simple mathematical procedures.

It is yet another object of the present invention to provide an optical set-up allowing accurate and sensitive mapping of position-dependent properties of phase objects.

SUMMARY OF THE INVENTION

The inventors have found that a unique optical arrangement may be effectively used to determine the optical properties of a phase object. This optical arrangement is characterized in that gratings used to generate moiré patterns are placed between a source of diffuse light and the object to be tested. The inventors have also surprisingly found that using this novel arrangement, the optical properties of interest, such as the power of a given lens, are linearly related to certain quantities derivable from the moiré pattern, and that the proportionality coefficient of said linear relation is a constant depending on the geometrical features of said arrangement.

Thus, in one aspect, the present invention provides a method for measuring the optical parameters of a phase object, comprising recording a moiré pattern viewed through said phase object, said moiré pattern being formed by illuminating by means of a source of diffuse light, first and second gratings positioned in the space between said light source and said phase object, wherein the plane of said first grating is parallel to the plane of said second grating, and calculating the optical parameters of interest from said moiré pattern.

The term "phase object" as used herein refers to an object that neither absorbs light nor reflects it, but rather changes the phase of light or deflects it. Examples of phase objects that may be tested according to the present invention are lenses, glass plates, windshields, Perspex sheets, beamsplitters and goggles. The term "phase object", as used herein, also embraces any medium that exhibits changes in its refractive index. Such medium may be a liquid or a crystalline solid. In a particularly preferred embodiment of the invention the phase object to be tested is a lens. The lens to be tested may be of any type, including (but not limited to): spherical lens, cylindrical lens, toric lens, progressive lens and multifocal lens.

The term "grating", as used herein, refers to a periodic structure consisting of alternating transparent and opaque regions. Such grating may be provided in the form of a set of equally spaced straight lines, or in the form of a grid. Preferably, the first and second gratings are angularly oriented with respect to each other. According to a preferred embodiment of the invention, the first and second gratings are provided in the form of first and second grids, respectively, wherein each grid is obtained by overlapping two identical sets of equidistant parallel lines at an angle of 90°. Preferably, the periodicity of the sets of equidistant parallel lines forming the first grid is different from the periodicity of the sets of equidistant parallel lines forming the second grid.

The term "periodicity", when used herein in relation to the gratings, refers to the length of a single period within the grating. A grating's period consists of an opaque region and the adjacent transparent region (e.g., the combined width of an opaque and adjacent transparent line). The term "periodicity", when used herein in relation to the fringes displayed by the moiré pattern, refers to the length of a single fringe's period. One fringe period consists of a dark band and adjacent bright band observed in the moiré pattern. The term "spatial frequency", as used herein, is proportional to the inverse of periodicity, and is given by the number of grating periods, or fringe periods, per unit of length. Preferably, the unit of length is the entire width or height of the recorded moiré pattern. The spatial frequency may be conveniently expressed by means vector quantities in the spatial frequency plane, the scalar components of said vector quantities corresponding to the number of grating's periods (or fringe periods) along the X and Y axes of said plane. These vector quantities are related to the second derivatives $$\frac{\partial^2 D}{\partial x^2}, \frac{\partial^2 D}{\partial y^2}, \frac{\partial^2 D}{\partial x \partial y}, \frac{\partial^2 D}{\partial y \partial x}$$

of the wavefront of the beam exiting the phase object, which wavefront is designated D. The optical properties that are calculated according to the present invention depend linearly on the values of said derivatives.

According to a preferred embodiment of the invention, the gratings are illuminated by light that has been filtered, such that the light transmitted through the filter has a wavelength distribution in the form of a narrow band centered on a preselected wavelength $\lambda$, and the two gratings are separated from each other by a distance d, given by $d = n \cdot p_1 p_2 / \lambda$, wherein n is an integer number (n=1, 2, 3 ...) and $p_1$ and $p_2$ indicate the periodicity of the first and second gratings, respectively.

According to a preferred embodiment of the invention, the recording of the moiré pattern generated between the images of the first and second gratings, said images being formed by the phase object, is effected by means of a camera focused at a plane between the gratings. Preferably, the camera is located at a predetermined distance from said gratings, such that, in the absence of the object to be tested, a desired reference moiré pattern consisting of horizontal and vertical fringes is captured by said camera, this reference pattern being distorted on introduction of the object to be tested.

According to a preferred embodiment of the invention, the calculation of the optical parameter of interest comprises transforming the recorded moiré pattern into one or more spots in the spatial frequency plane, said transformation being preferably effected by means of Fourier transform techniques, such that the vectors defining said spots are the vectors of spatial frequencies $V_y$ and $V_x$ associated with said moiré pattern, identifying the components of said vectors $(V_{yx}, V_{yy})$ and $(V_{xx}, V_{xy})$ and substituting their values in an equation which linearly relates said optical parameter of interest to the second order derivatives $$\frac{\partial^2 D}{\partial x^2}, \frac{\partial^2 D}{\partial x \partial y}, \frac{\partial^2 D}{\partial y \partial x}, \frac{\partial^2 D}{\partial y^2},$$

respectively, wherein D is the wavefront of the beam exiting the phase object.

According to a preferred embodiment of the invention, the calculation of the optical parameter of interest is effected using an equation that linearly relates said optical parameter of interest to the second order derivatives $$\frac{\partial^2 D}{\partial x^2}, \frac{\partial^2 D}{\partial x \partial y}, \frac{\partial^2 D}{\partial y \partial x}, \frac{\partial^2 D}{\partial y^2},$$

wherein D is the wavefront of the beam exiting the phase object, wherein the coefficient of proportionality k in said linear equation is given by $k = p_1/d$, wherein d is the distance between the two gratings and $p_1$ is related to the periodicity of said gratings and to the distances between said gratings and the camera used to record the moiré pattern.

According to a preferred embodiment of the invention, the coefficient of proportionality k is computed by plotting, for two or more calibration lenses whose powers are known, said powers as a function of one or more of the second order derivatives $$\frac{\partial^2 D}{\partial x^2}, \frac{\partial^2 D}{\partial x \partial y}, \frac{\partial^2 D}{\partial y \partial x}, \frac{\partial^2 D}{\partial y^2},$$

wherein D is the wavefront of the beam exiting the phase object, for each calibration lens, to obtain a linear function, the slope of which equals k.

In another aspect, the present invention provides an apparatus for determining the optical properties of a phase object by means of moiré analysis, comprising:

A source for producing diffuse light;

First and second gratings capable of producing a moiré pattern, wherein said gratings are placed in the space between said light source and the position intended for said phase object, and the plane of said first grating is parallel to the plane of said second grating; and Means for recording the moiré pattern viewed through said phase object.

Preferably, the apparatus comprises a suitable transparent support for placing the tested object thereon. Alternatively, the phase object is placed on the surface of the second grating, said surface being the surface facing the recording means. Preferably, the means for recording the moiré pattern comprises a camera positioned at a predetermined distance from the gratings. Preferably, the apparatus according to the present invention comprises calculation means for calculating from the moiré pattern photographed by the camera the optical properties of the phase object to be tested. Preferably, the apparatus comprises display means for representing the values of a position-dependent optical parameter of a phase object under test by means of a contour map corresponding to the surface of said object. The calculation means and display means may be provided in the form of an external computer, which is connected to the apparatus of the invention. Alternatively, said computer may be incorporated within the apparatus itself. Preferably, the apparatus according to the invention comprises filter means coupled to the source of diffuse light, to allow the transmission of a preselected wavelength. Preferably, the apparatus according to the invention comprises means positioned between the light source and the first grating, for uniformly projecting the diffuse light into the space between said light source and the phase object.

DETAILED DESCRIPTION OF PREFERRED EMBODIMENTS

After passing through the phase object under test, e.g., the lens, the ray of light is curved. The curvature of the ray exiting the phase object is related to the optical properties of the lens. Since the curvature of a ray is given by the second order derivatives of the wavefront D of said ray $$\frac{\partial^2 D}{\partial x^2}, \frac{\partial^2 D}{\partial x \partial y}, \frac{\partial^2 D}{\partial y \partial x}, \frac{\partial^2 D}{\partial y^2},$$

the values of said derivatives (which may be position-dependent) must be computed. According to the present invention, the values of $$\frac{\partial^2 D}{\partial x^2}, \frac{\partial^2 D}{\partial x \partial y}, \frac{\partial^2 D}{\partial y \partial x}, \frac{\partial^2 D}{\partial y^2}$$

are determined by measuring the spatial frequencies of a moiré pattern viewed through the tested phase object, said moiré pattern being formed by illuminating by means of a source of diffuse light, first and second gratings positioned in the space between said light source and said phase object.

Figure 1:
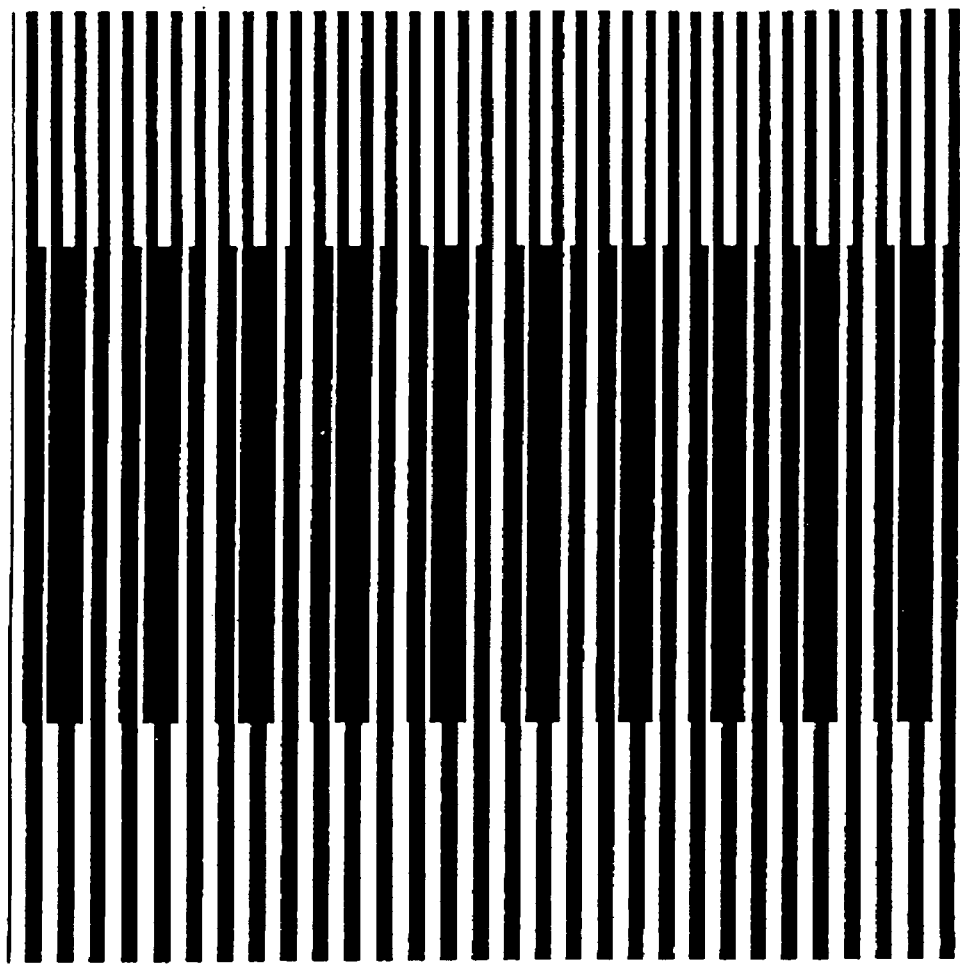
FIG. 1 illustrates a simple form of moiré pattern of two parallel gratings.
Figure 2A:
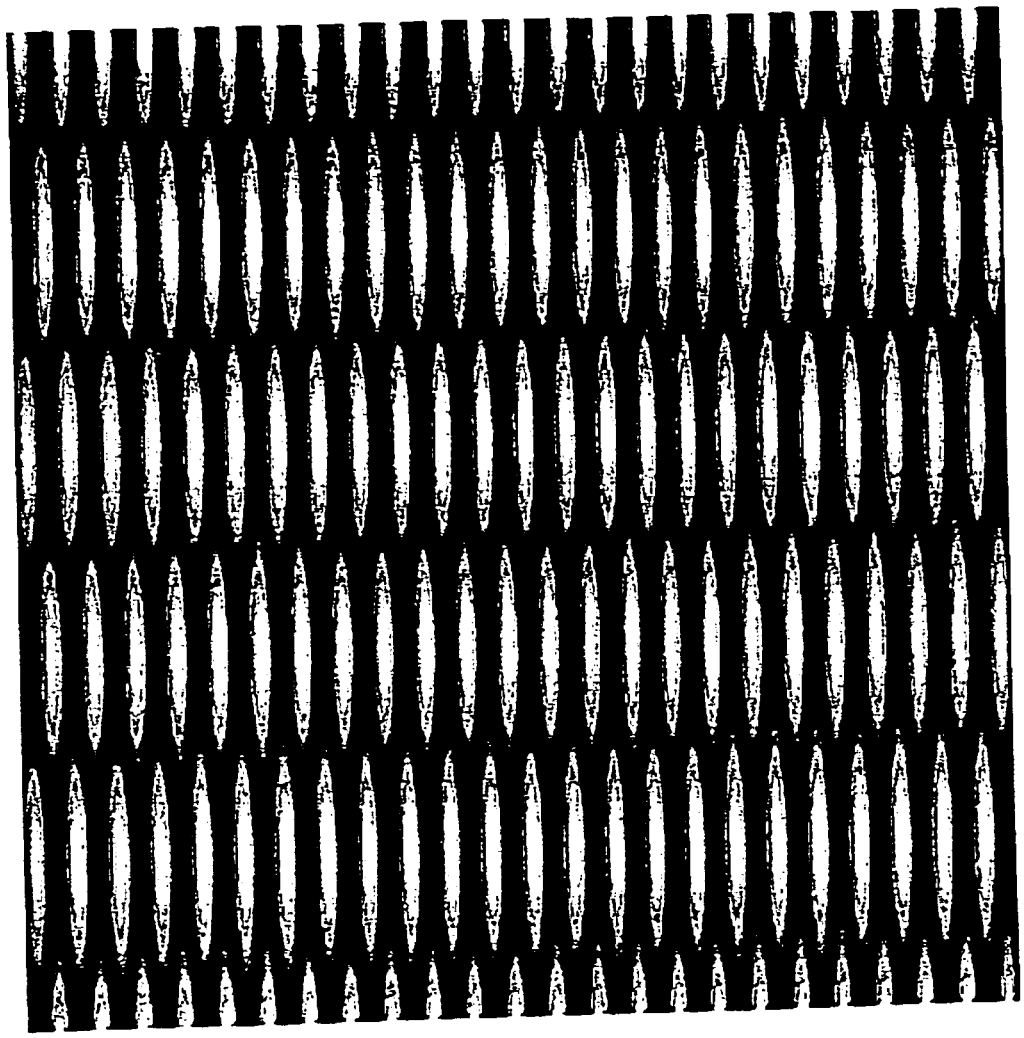
FIGS. 2a and 2b illustrate the moiré pattern generated by two gratings with identical and different periodicities, respectively.
Figure 2B:
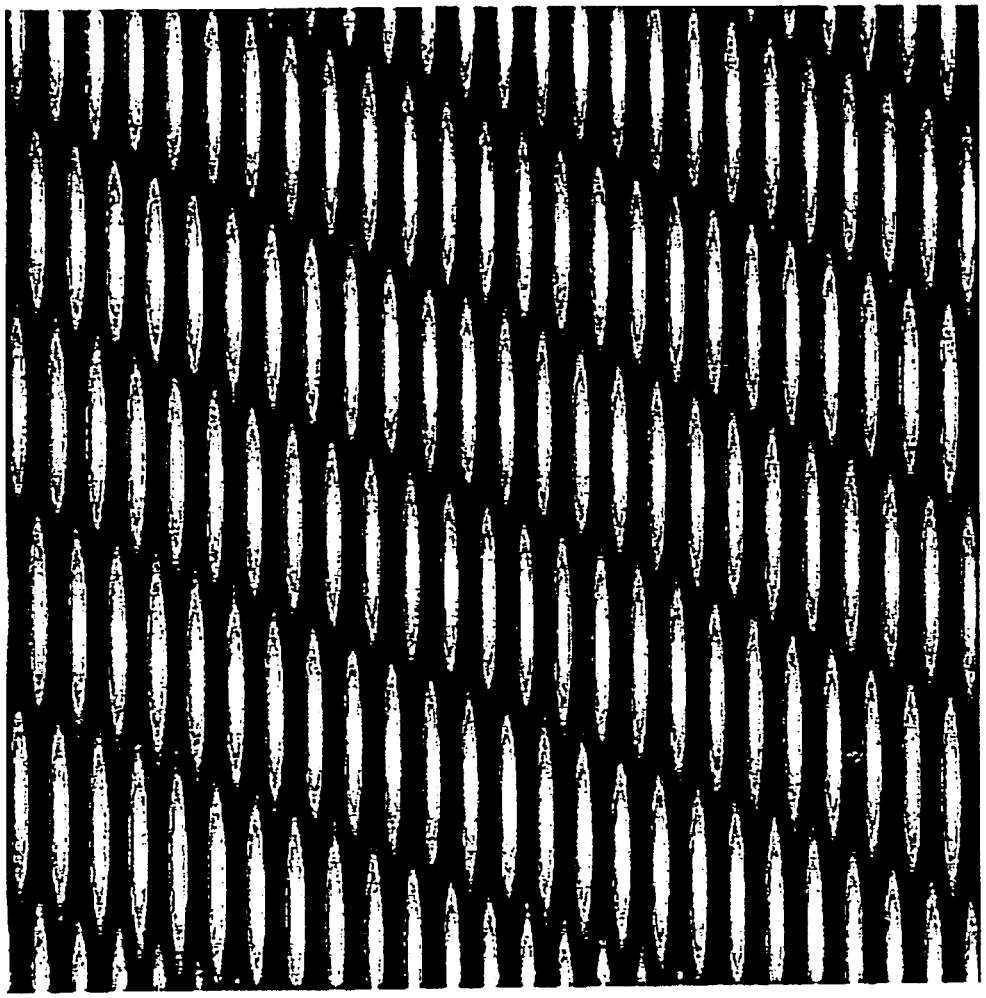

FIGS. 1, 2a and 2b are provided for the purpose of illustrating the moiré effect.

FIG. 1 presents the moiré pattern observed when two parallel sets of vertical lines (that is, lines which lie in the Y direction) are overlapped, wherein the spacing between the lines of one set differs from that of the other set. The spatial frequency of the upper set and the lower set is 40 and 30 per unit of length, respectively, wherein said unit of length is the width of the frame. The number of the beat fringes in the overlap section, that is, the spatial frequency of the moiré fringes, equals to the difference between the spatial frequencies of the overlapping sets (40−30=10).

Each moiré pattern is associated with one or more vectors describing the spatial frequency of the fringes. For example, the vector describing the spatial frequency of the vertical fringes observed in FIG. 1 is $V_x(10,0)$, since, as indicated above, the fringe pattern shown in the figure comprises 10 periods in the horizontal (X) direction, and none in the vertical (Y) direction.

FIGS. 2a and 2b present the moiré patterns generated by means of a first and second gratings, each of which is provided in the form of a set of equally spaced vertical lines (that is, lines which lie in the Y direction), wherein the gratings are oppositely rotated, such that the lines of the first grating are angularly oriented relative to the lines of the second grating at an angle θ. FIG. 2a illustrate the reference case, where no phase object is tested. In the reference case, the angularly oriented gratings produce horizontal fringes, wherein the direction of the fringes displayed in FIG. 2a is perpendicular to the bisector of the angle θ. The vector describing the spatial frequency of the horizontal fringes observed in FIG. 2a is $V_y$ (0,5), since the fringe pattern shown in the figure comprises 5 periods in the vertical (Y) direction, and none in the horizontal (X) direction.

FIG. 2b illustrate the tilted moiré fringes displayed following the introduction of a lens. The vector describing the spatial frequency of the fringes observed in FIG. 2b is $V_y(\sim 2,5)$, since the fringe pattern shown in the figure comprises approximately 2 periods in the horizontal (X) direction, and 5 periods in the vertical (Y) direction. The exact frequencies need not be to integers, as seen in the case of FIG. 2b.

These vector quantities, containing the information in relation to the moiré pattern, are calculated using Fourier transform techniques, as described herein below. The optical properties of the tested phase object are related to these vector quantities, as explained in detail below.

Figure 3:
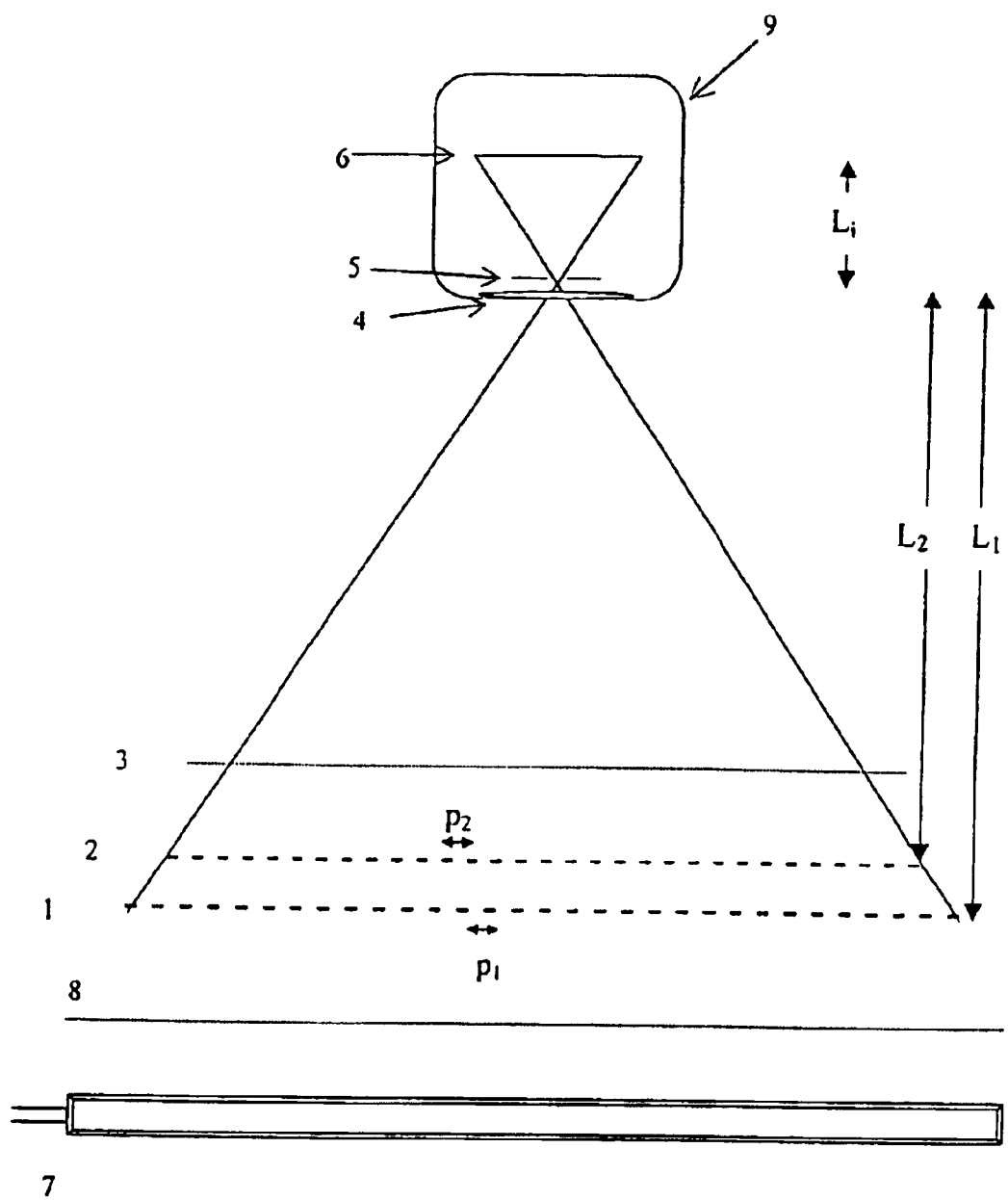
FIG. 3 schematically describes the preferred optical arrangement used according to the present invention.

FIG. 3 illustrates a preferred arrangement used according to the present invention for measuring the optical properties of lenses. The light source 7 is a source of diffuse light, which may be provided by incandescent or fluorescent lamps, or an array of light emitting diodes. The lens to be tested is positioned on a suitable support 3, which is made of good quality transparent sheet. Preferably, suitable means, for example, a mat screen 8, is positioned between the light source 7 and the first grating 1, to ensure that a diffuse light is uniformly projected into the space between said light source and said support. Most preferably, filter means (not shown) are used, to allow the selective transmission of a desired wavelength, which is typically 546 nanometers.

The first and second gratings (1,2) are placed in parallel to each other, preferably by means of a spacer ring fixed in the space between the light source and the support 3. Suitable gratings, known in the art as Ronchi rulings, are in the form of a glass substrate of optical quality with equidistant parallel lines ruled on it, said lines being typically made of evaporated chrome. Typical periodicities of suitable gratings are at least 0.025 mm or above, that is, the spatial frequency of the grating is not greater than 40 line-pairs per mm. The gratings are commercially available (for example, from Edmund Scientific, 101 East Gloucester Pike, Barrington, N.J. 08007, USA). The gratings are angularly orientated with respect to each other, that is, the rulings of the first grating form an angle θ with the rulings of the second grating.

Means for photographing the moiré patterns are generally indicated by numeral 9, wherein numerals 4, 5 and 6 refer to the camera lens, the camera aperture and the sensor plane of the camera, respectively.

The camera lens 4 is preferably focused at the region between the gratings 1,2, and most preferably, on a plane midway between the gratings. Preferably, the dimension of the aperture 5 is sufficiently small, to allow greater depth of field, such that the virtual images of the gratings that are expected to be produced by the lens to be tested at various distances from the camera, as explained below, are all "in focus". Decreasing the aperture improves contrast, until an optimal aperture size is reached, beyond which the contrast deteriorates. The preferred dimension of the aperture depends on the distance between the gratings (1,2) and their periodicities, the intensity of the light used (7), the size of the sensor plane (6) and the focal length of the camera lens (4). In practice, the dimension of the aperture is adjusted by experimentation.

According to the method of measurement of the present invention, the reference moiré pattern recorded by the camera in the absence of the lens to be tested should be similar to the pattern observed when two gratings having identical periodicities are superimposed on one another at a small angle, as shown for example in FIG. 2a, wherein the fringes are horizontal. The introduction of the lens to be tested distorts this reference pattern, producing a tilted moiré pattern from which the optical parameters of interest may be derived, using mathematical procedures, which will be described in more detail below. The design of the geometrical characteristics of the arrangement shown in FIG. 3, that is, the distances between the various elements shown in the figure, is aimed to serve the methodology presented above.

The first and second gratings used according to the present invention have different periodicities, denoted $p_1$ and $p_2$, respectively. In order to ensure that the images produced by the camera lens 4 on the camera sensor plane have exactly the same periodicities, the following condition should be satisfied:

$$p_1 L_i / L_1 = p_2 L_i / L_2 \quad \text{(Equation 1)}$$

wherein $L_i$ designates the distance between the sensor plane 6 and the plane of the aperture 5, and $L_1$ and $L_2$ designate the distance between the first grating and the aperture plane, and the second grating and the aperture plane, respectively. The quantity given by the above equation is the periodicity of the images produced by the camera lens. Hereinafter, this quantity is denoted $p_i$. Thus, if $L_1$ and $L_2$ are chosen such that equation 1 is satisfied, then the periods of the images of the gratings on the camera sensor plane will be the same, and, in the absence of a phase object to be tested, a desired reference pattern is recorded by the camera.

Another important geometrical parameter of the optical arrangement used according to the present invention is the distance between the first and second gratings. Hereinafter, this distance is denoted d. In order to reduce as much as possible the blurring of the images of the gratings as they propagate through space, and to assure satisfactory contrast of the moiré fringes recorded by the camera, said distance should preferably satisfy the following condition:

$$d = n \cdot p_1 p_2 / \lambda (n=1,2,3 \ldots), \quad \text{(Equation 2)}$$

that is, the distance should preferably be an integral multiple of the quantity $p_1 p_2 / \lambda$, wherein $\lambda$ is the wavelength of the transmitted light.

In practice, two gratings having different periods are placed in the space between the source of diffuse light and the support intended for the lens, such that the plane of the first grating is parallel to the plane of the second grating, said gratings being mutually separated by a distance d as given by equation 2, the rulings of the first grating being angularly oriented with respect to the rulings of the second grating, and the camera is positioned with respect to said gratings such that the desired reference pattern is recorded thereby.

Figure 4:
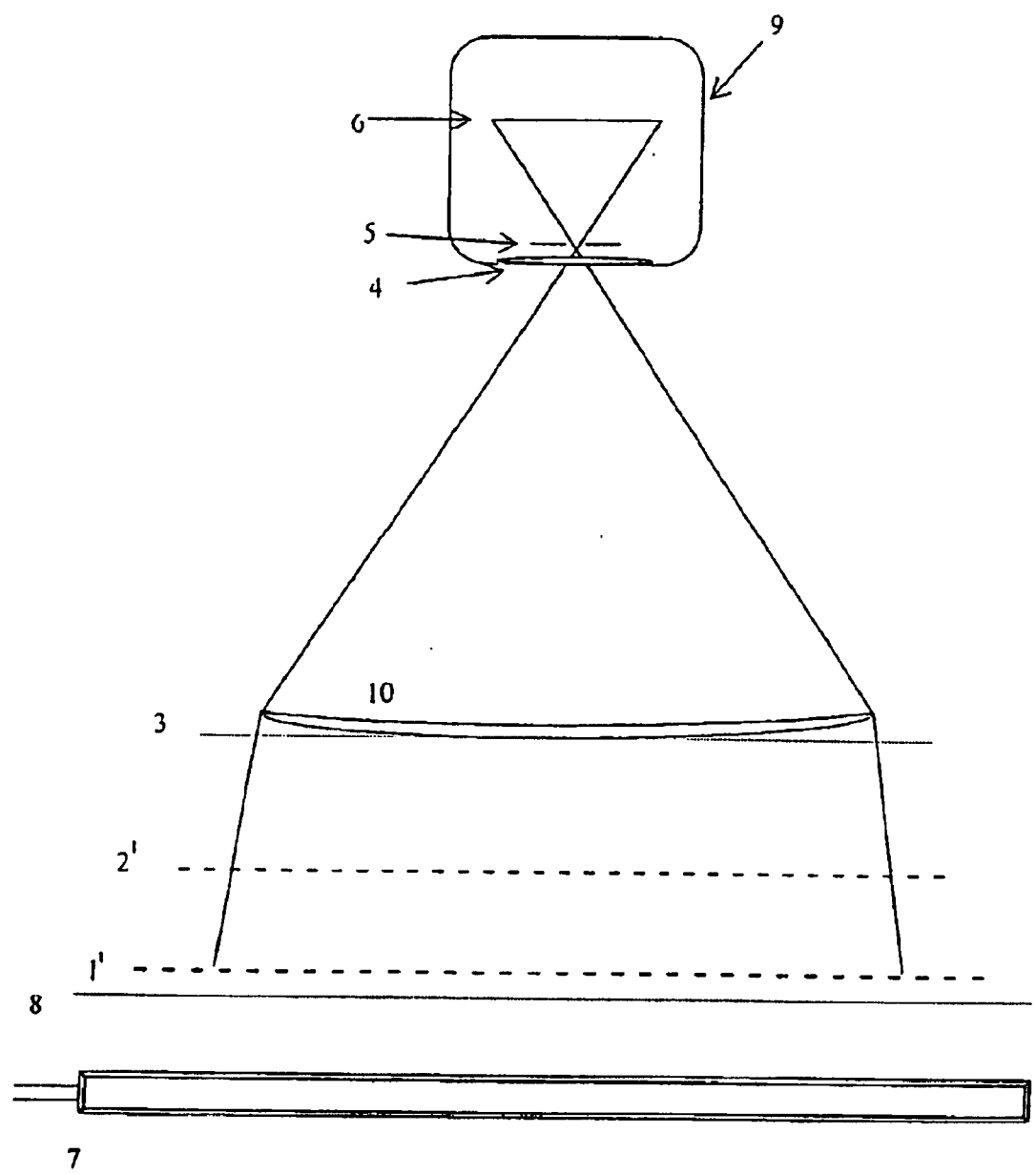
FIG. 4 schematically illustrates the method of measurement according to the present invention.

According to a preferred embodiment of the present invention, which is particularly useful for measuring the optical properties of phase objects, wherein said optical properties are position-dependent, each of the first and second gratings used in the arrangement described in FIGS. 3 and 4 is provided in the form of a grid, wherein said grid is obtained by overlapping two identical sets of equidistant parallel lines (e.g., Ronchi rulings) at an angle of 90°.

Once the lens to be tested (10) is placed on the support 3, as shown in FIG. 4, the first and second gratings are replaced by their images, which are formed by the tested lens. These images (designated 1' and 2', respectively) differ in both position and periodicity from the actual gratings. Consequently, the moiré pattern generated by said images, which is photographed by camera 9, is different from the reference pattern consisting of vertical and horizontal fringes obtained in the absence of the lens. The distorted pattern needs to be resolved, in order to calculate the vectors $V_x$ ($V_{xx}$, $V_{xy}$) and $V_y$ ($V_{yx}$, $V_{yy}$) therefrom, which vectors describe the X and Y spatial frequencies, respectively.

Preferably, the camera is connected to a computer for automatically analyzing the recorded moiré pattern according to the mathematical procedures described below.

According to a preferred embodiment of the invention, Fourier transformation techniques, such as those disclosed, for example, in Pirga et al. [Optical Engineering, 34 (8), p. 2459–2466 (1995)], Morimoto et al. [Optical Engineering 27, p. 650 (1988)] and Sciamarella et al. [Experimental Mechanics, 24 p. 468 (1965)] are used to resolve the distorted moiré pattern, deriving therefrom the components of the vectors of the spatial frequencies associated with each pattern. Briefly, for a given distorted pattern, the Fourier transform generates one or more points in the xy plane, wherein the coordinates of each point correspond to the components of a vector of spatial frequency associated with said pattern. Preferably, the unit of length used in the definition of the spatial frequencies according to the present invention is the entire width or height of the moiré pattern frame, thus assuring that the coordinates (in pixels) of a given point in the Fourier transform plane are identical to the components of the vector of spatial frequency related to said point.

Figure 5A:
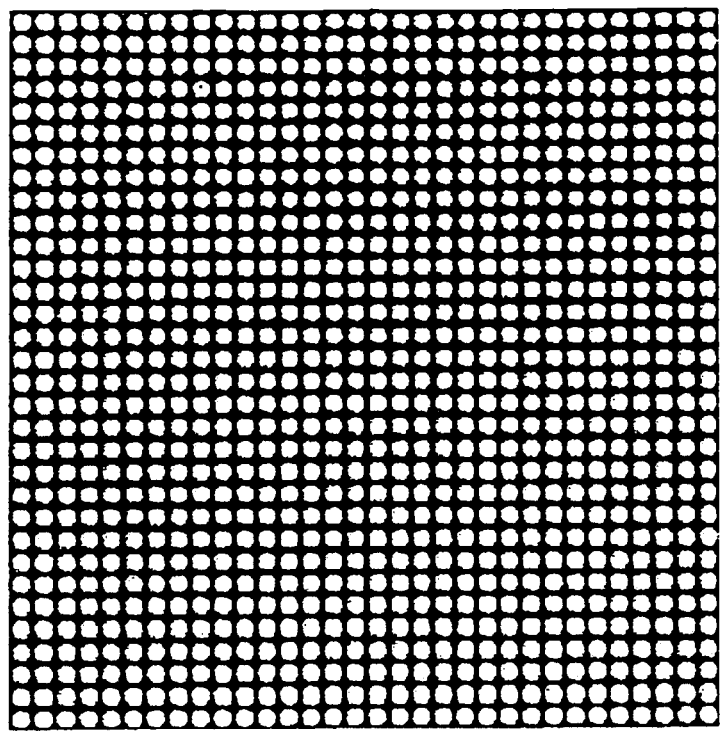
FIGS. 5a and 5b show a preferred reference moiré pattern, and the corresponding Fourier transform, respectively.
Figure 5B:
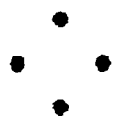

For example, the reference pattern generated by means of gratings provided in the form of grids, in the absence of a phase object to be tested, is shown in FIG. 5a. The reference pattern consists of vertical and horizontal fringes. FIG. 5b illustrate the Fourier transform corresponding to the moiré pattern of FIG. 5a. The coordinates of the points shown in the figure provide the quantities of interest, $V_{uv}$ (u=x,y;v=x,y), as follows:

Coordinates of the upper spot—($V_{yx}$, $V_{yy}$)

Coordinates of the left spot—($V_{xx}$, $V_{xy}$)

It is apparent from FIG. 5b, that for the reference pattern, $V_{yx} = V_{xy} = 0$, and $V_{yy} = -V_{xx}$.

The optical parameters of the tested lens are related to the components of the vectors of the spatial frequencies associated with the observed pattern through relatively simple mathematical relations, which may be used to calculate the average power of the lens ($P_{av}$), the cylinder magnitude (Cyl) and the axis direction (Ax), as follows:

$$P_{av} = k \left( \frac{\partial^2 D}{\partial x^2} + \frac{\partial^2 D}{\partial y^2} \right) / 2 \quad \text{(equation 3)}$$

$$Cyl = k \left\{ \left( \frac{\partial^2 D}{\partial x^2} - \frac{\partial^2 D}{\partial y^2} \right)^2 + \left( \frac{\partial^2 D}{\partial x \partial y} + \frac{\partial^2 D}{\partial y \partial x} \right)^2 \right\}^{1/2} \quad \text{(equation 4)}$$

$$Ax = 1/2 \arctan \left\{ \left( \frac{\partial^2 D}{\partial x^2} - \frac{\partial^2 D}{\partial y^2} \right) / \left( \frac{\partial^2 D}{\partial x \partial y} + \frac{\partial^2 D}{\partial y \partial x} \right) \right\} \quad \text{(equation 5)}$$

wherein $k = p_i/d$, ($p_i$ and d are as defined above), and $$\frac{\partial^2 D}{\partial u \partial v} (u = x, y; v = x, y)$$

are the second order derivatives of wavefront exiting the tested phase object, which are associated with the observed moiré pattern as follows:

$$\frac{\partial^2 D}{\partial x^2}$$

is the x component of the Y spatial frequency ($V_{yx}$) of the observed pattern;

$$\frac{\partial^2 D}{\partial x \partial y}$$

is the y component of the Y spatial frequency ($V_{yy}$) of the observed pattern;

$$\frac{\partial^2 D}{\partial y^2}$$

is the y component of the X spatial frequency ($V_{xy}$) of the observed pattern;

$$\frac{\partial^2 D}{\partial y \partial x}$$

is the x component of the X spatial frequency ($V_{xx}$) of the observed pattern;
wherein the X and Y frequencies are defined relative the reference pattern.

Equations 3 to 5 constitute the general working equations according to the present invention, which equations are used for calculating the optical parameters of different phase objects. Once the constant k and the quantities $$\frac{\partial^2 D}{\partial u \partial v}(u=x,y; v=x,y)$$

are known, equations 3 to 5 may be used to calculate the power and the cylinder of a given phase object to be tested.

In a preferred embodiment of the present invention, the value of k is obtained as follows. It is apparent from equations 3 and 4 that the optical parameter of interest, (for example, the power of the lens in the case of equation 3), is linearly dependent on $$\frac{\partial^2 D}{\partial u \partial v}(u=x,y; v=x,y),$$

the quantities derived from the moiré pattern. As mentioned earlier, the coefficient of proportionality k, wherein $k=p_1/d$, is a constant characteristic of the geometry of the arrangement used according to the invention. In practice, the value of k may be most conveniently computed by plotting, for two or more calibration lenses whose powers are known, said powers as a function of $$\frac{\partial^2 D}{\partial u \partial v}(u=x,y; v=x,y),$$

wherein said $$\frac{\partial^2 D}{\partial u \partial v}(u=x,y; v=x,y)$$

are derived from the moiré pattern, to obtain a linear function the slope of which equals k. It is preferable to use spherical lenses as the calibrations lenses, since for these lenses, equation 3 reduces to a simpler form, as described below.

According to one preferred embodiment of the invention, the phase object to be tested is a spherical lens. A spherical lens generates a moiré pattern wherein $$\frac{\partial^2 D}{\partial x^2} = \frac{\partial^2 D}{\partial y^2}$$

and $$\frac{\partial^2 D}{\partial x \partial y} = -\frac{\partial^2 D}{\partial y \partial x}.$$

Thus, in the case of a spherical lens, equation 3 obtains the following form:

$$P = k \cdot \frac{\partial^2 D}{\partial x^2} \quad \text{(Equation 6)}$$

It is apparent that the determination of k through the calibration procedure described above may be most conveniently effected using the linear relation according to equation 6. Once k is known, equation 6 may be used to calculate the power of any given spherical lens.

Figure 6A:
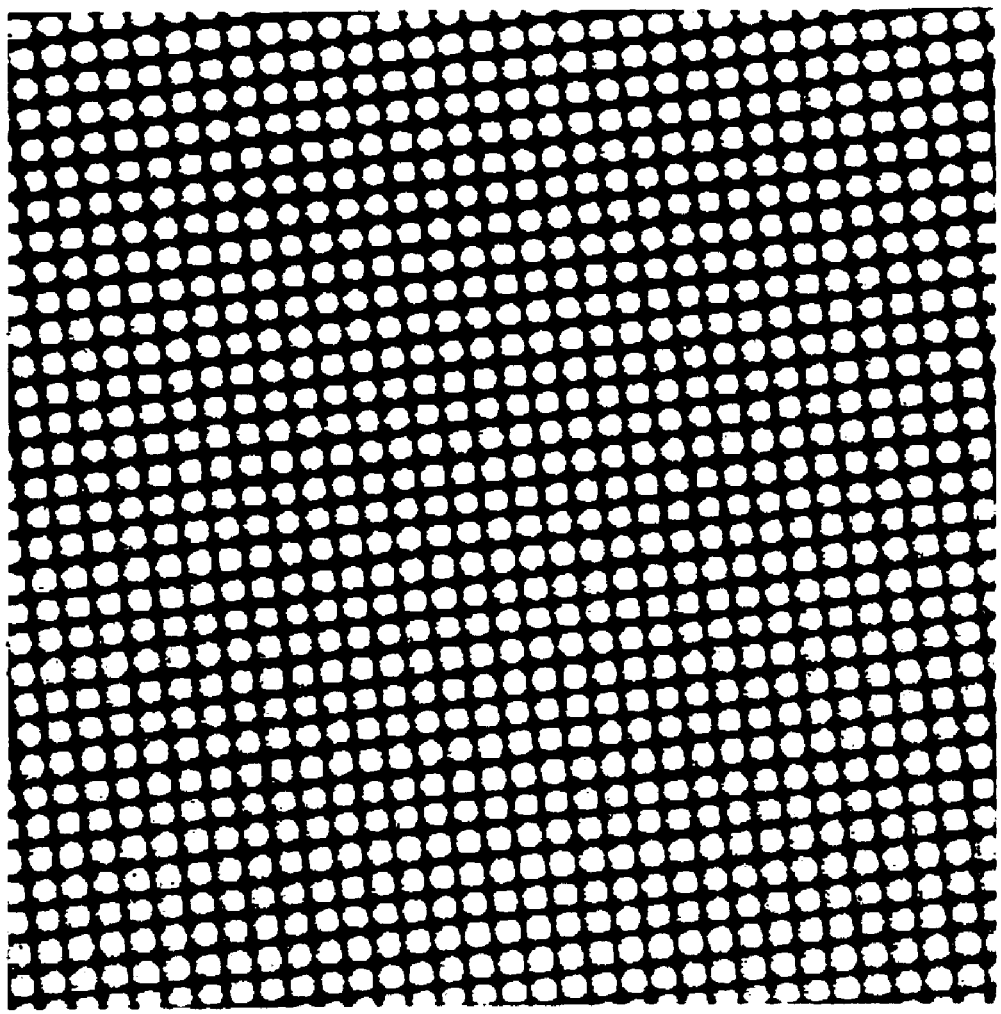
FIGS. 6a and 6b show a moiré pattern generated by the method according to the present invention, when the phase object to be tested is a spherical lens, and the corresponding Fourier transform, respectively.
Figure 6B:
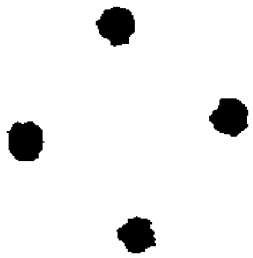

FIGS. 6a and 6b illustrate the distorted moiré pattern recorded according to the present invention, following the introduction of a spherical lens in the arrangement shown in FIG. 4, where the gratings used are in the form of grids, and the corresponding calculated Fourier transform, respectively. As shown in FIG. 6a, the squares characterizing the reference pattern, are retained in the distorted pattern observed. However, the pattern is rotated, in comparison to the reference pattern, at an angle that depends on the power of the lens. The coordinates of the spots depicted in FIG. 6b provide the quantities of interest, $V_{uv}(u=x,y;v=x,y)$, as follows:

Coordinates of the upper spot—($V_{yx}$, $V_{yy}$)
Coordinates of the left spot—($V_{xx}$, $V_{xy}$)

It is apparent from FIG. 6b, that for the case wherein the phase object to be tested is a spherical lens, $V_{yy}=-V_{xx}$ and $V_{yx}=V_{xy}$. Hence, $$\frac{\partial^2 D}{\partial x \partial y} = -\frac{\partial^2 D}{\partial y \partial x} \quad \text{and} \quad \frac{\partial^2 D}{\partial x^2} = \frac{\partial^2 D}{\partial y^2},$$

resulting in a vanishing contribution to the cylinder expression of equation 4.

Figure 7:
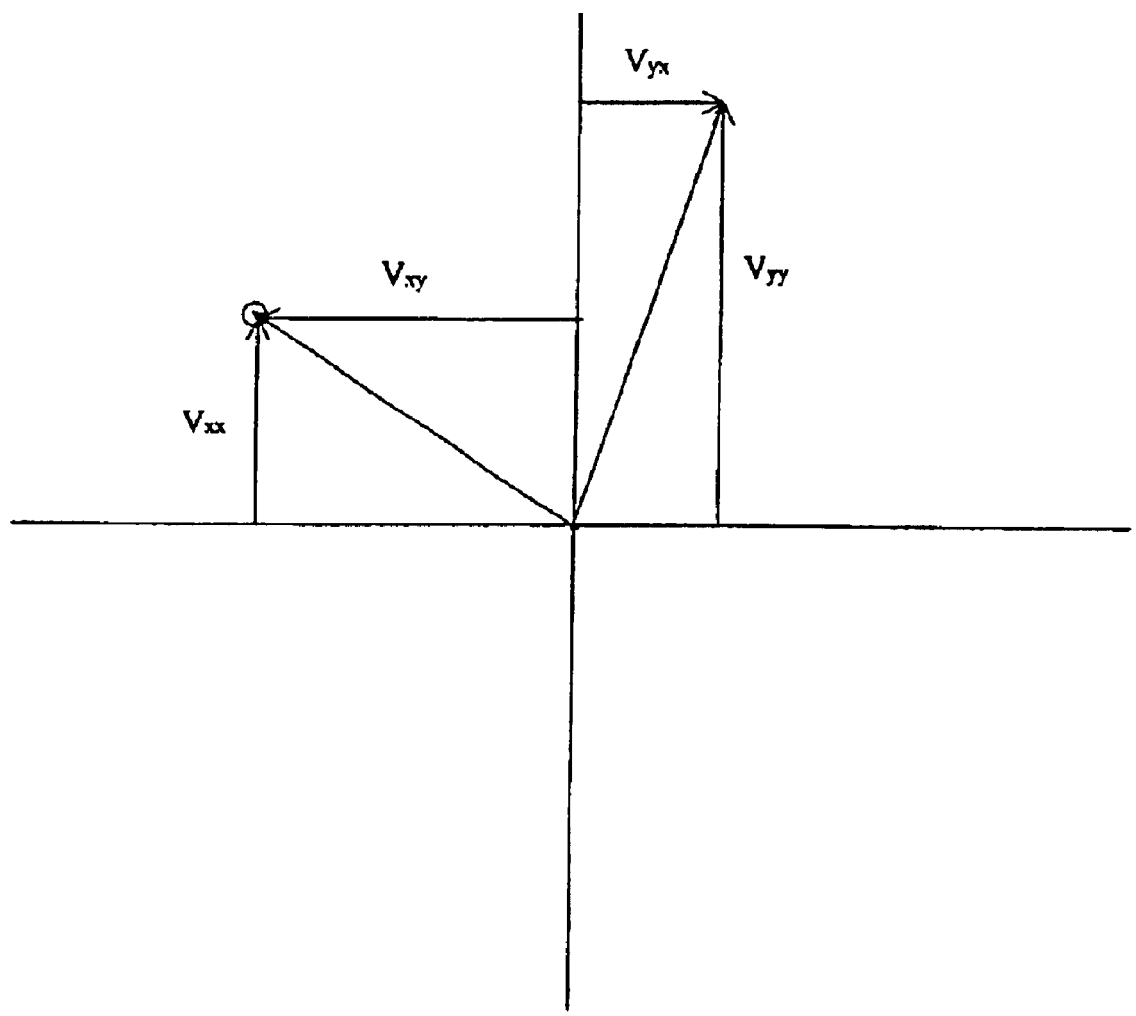
FIG. 7 shows the Fourier transform corresponding to a moiré pattern generated by the method according to the present invention, when the phase object to be tested is a toric lens.

According to another preferred embodiment of the present invention, the phase object to be tested is a cylindrical lens or a toric lens. FIG. 7 illustrates the Fourier transform generated for this case. It is apparent from the figure that $V_{yx}$ is different from $V_{xy}$ (hence, $$\frac{\partial^2 D}{\partial x^2} \neq \frac{\partial^2 D}{\partial y^2}\Bigg)$$

and $V_{yy}$ is different from $V_{xx}$ (hence, $$\frac{\partial^2 D}{\partial x \partial y} \neq -\frac{\partial^2 D}{\partial y \partial x}\Bigg).$$

resulting in non-vanishing contribution to the cylinder expression of equation 4.

Figure 8:
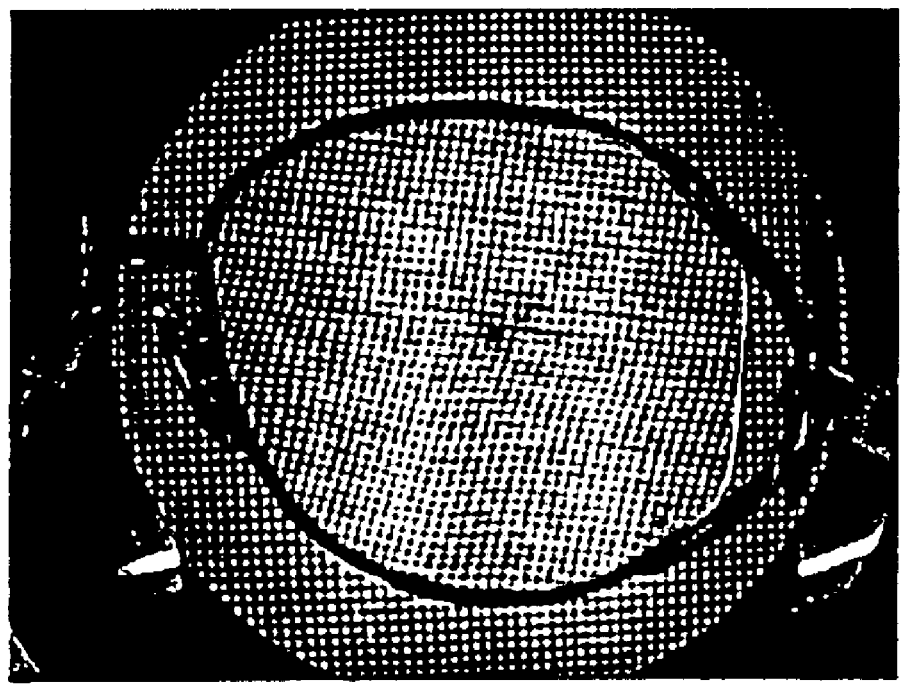
FIG. 8 illustrates the fringe pattern produced by a typical progressive lens.

According to another preferred embodiment of the invention, the phase object to be tested is a progressive lens or a multifocal lens, wherein the optical parameters of interest are position dependent, that is, they have different values at different points on the surface of the tested object. Consequently, both the direction and frequency of the moiré fringes produced by these lenses vary across the lens surface, that is, the vector components $V_{uv}(u=x,y;v=x,y)$ and the corresponding second order derivatives $$\left(\frac{\partial^2 D}{\partial u \partial v}(u=y,x;v=x,y)\right)$$

are position-dependent. FIG. 8 shows the fringe pattern produced by a typical progressive lens.

The process of calculating the power and the cylinder of a given progressive or multifocal lens at different points on the lens surface is called "mapping". In order to use equations 3 to 5 for the mapping process, it is necessary to calculate first $V_{uv}(u=x,y;v=x,y)$ at any point $(x_0,y_0)$. This may be done using known mathematical procedures, such as those described in Pirga et al. [Optical Engineering, 34 (8), p.2459–2466 (1995)]. Once the four values of $V_{uv}(u=x,y;v=x,y)$ for a given point $(x_0, y_0)$ are determined, the corresponding values for $$\left.\frac{\partial^2 D}{\partial u \partial v}\right|_{(x0,y0)}(u=y,x;v=x,y))$$

may be substituted in equations 3 and 4, to calculate the power and cylinder of the lens at said point.

Figures 9A, 9B:
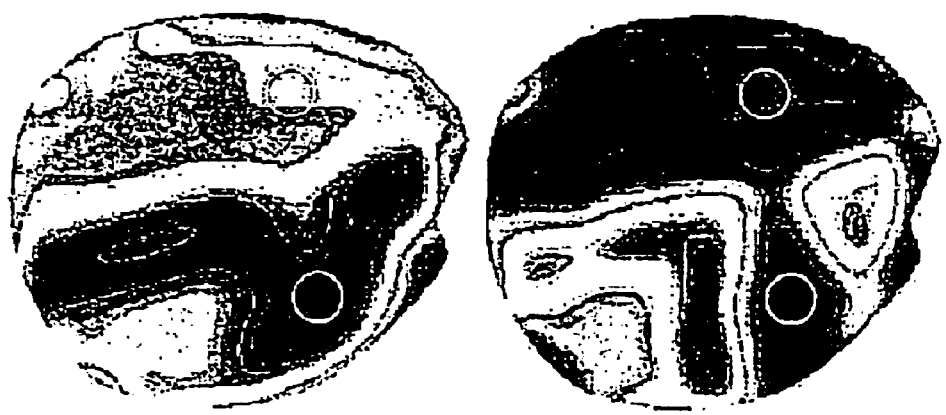
FIGS. 9a and 9b illustrate contour maps of power and cylinder of a progressive lens.

According to a preferred embodiment of the invention, the values of the position-dependent optical parameter of the phase object under test are represented by a contour map corresponding to the surface of said object. Contour maps of power and cylinder of a progressive lens are shown in FIGS. 9a and 9b, respectively.

The contour map generated according to the present invention may be used, in combination with information provided by other measuring systems, such as frame tracers and pupilometers, in processes for the production of various optical articles. For example, the use of a contour map provides, in combination with data related to the shape of a frame and prescription data relating to a patient, a convenient and accurate method for designing lenses for spectacles intended for said patient. The contour map is used to identify those regions of the lens having the desired optical properties, in accordance with the prescription data. Subsequently, the pupil location and the frame outline are overlaid on the map in order to permit optimal cutting of the lens by an edger, and optimal fitting of said lens to the patient.

The method according to the present invention may be coupled to other measuring systems, such as those disclosed in U.S. Pat. No. 5,872,625, which is incorporated herein entirely by reference.

The foregoing may be better understood by reference to the following examples, which are provided for illustration purposes.

EXAMPLES

Example 1

Measuring the Optical Properties of Lenses

The arrangement described in FIG. 4 was used to measure the power of a spherical lens, a toric lens and a progressive lens. The parameters of the arrangement were as follows:

Light source: an array of light emitting diodes (T1-¾, manufactured by The LED Light, 1629 Tumbleweed Rd., Fallon, Nev. 89407, USA) and diffusers (L43-725, manufactured by Edmund Optics)

Wavelength: in the range between 500 to 550 nm (filter used: Edmund Optics L43-945).

Grating spatial frequencies: Ronchi rulings with 39 line pairs/mm (in a grid form) and Ronchi rulings with 40 line pairs/mm (in a grid form)

Distance between second grating and lens support: 15 mm

Distance between gratings: 2.2 mm

Camera: Wat902B, manufactured by Watek.

Distance between lens support and camera aperture: 70.8 mm

Focal length of camera lens: 8 mm

Grating diameter: 100 mm

The results obtained were compared with the results measured by means of lensometer (Nidek ALM 990). In no case, did the difference exceed 0.1 diopter.

While specific embodiments of the invention have been described for the purpose of illustration, it will be understood that the invention may be carried out in practice by skilled persons with many modifications, variations and adaptations, without departing from its spirit or exceeding the scope of the claims.

What is claimed is:

1. A method for measuring the optical parameters of a phase object, comprising recording a moiré pattern viewed through said phase object, said moiré pattern being formed by illuminating by means of a source of diffuse light, first and second gratings positioned in the space between said light source and said phase object, wherein the plane of said first grating is parallel to the plane of said second grating, and calculating the optical parameters of interest from said moiré pattern.

2. A method according to claim 1, wherein the first and second gratings are provided in the form of first and second grids, respectively, wherein each grid is obtained by overlapping two identical sets of equidistant parallel lines at an angle of 90°.

3. A method according to claim 2, wherein the periodicity of the sets of equidistant parallel lines forming the first grid is different from the periodicity of the sets of equidistant parallel lines forming the second grid.

4. A method according to claim 1, wherein the gratings are illuminated by light that has been filtered, such that the light transmitted through the filter has a wavelength distribution in the form of a narrow band centered on a preselected wavelength λ, and the two gratings are separated from each other by a distance d, given by $d=n \cdot p_1 p_2/\lambda (n=1,2,3 \ldots)$, wherein $p_1$ and $p_2$ indicate the periodicity of the first and second gratings, respectively.

5. A method according claim 1, wherein the recording of the moiré pattern is effected by means of a camera focused at a plane between the gratings.

6. A method according to claim 5, wherein the camera is located at a predetermined distance from said gratings, such that, in the absence of the object to be tested, a desired reference moiré pattern consisting of horizontal and vertical fringes is captured by said camera.

7. A method according to claim 1, wherein the calculation of the optical parameter of interest comprises transforming the recorded moiré pattern into one or more points in the spatial frequency plane, such that the vectors defining said points are the vectors of spatial frequencies $V_y$ and $V_x$ associated with said moiré pattern, identifying the components of said vectors $(V_{yx}, V_{yy})$ and $(V_{xx}, V_{xy})$ and substituting their values in an equation which linearly relates said optical parameter of interest to the second order derivatives $$\frac{\partial^2 D}{\partial x^2}, \frac{\partial^2 D}{\partial x \partial y}, \frac{\partial^2 D}{\partial y \partial x}, \frac{\partial^2 D}{\partial y^2},$$

respectively, wherein D is the wavefront of the beam exiting the phase object.

8. A method according to claim 7, wherein the calculation of the optical parameter of interest is effected using an equation that linearly relates said optical parameter of interest to the second order derivatives $$\frac{\partial^2 D}{\partial x^2}, \frac{\partial^2 D}{\partial x \partial y}, \frac{\partial^2 D}{\partial y \partial x}, \frac{\partial^2 D}{\partial y^2},$$

wherein D is the wavefront of the beam exiting the phase object, wherein the coefficient of proportionality k in said linear equation is given by $k=p_1/d$, wherein d is the distance between the two gratings and $p_i$ is related to the periodicity of said gratings and to the distances between said gratings and the camera used to record the moiré pattern.

9. A method according to claim 1, wherein the measured optical parameter of the phase object under test is position-dependent, and the values of said optical parameter are represented by a contour map corresponding to the surface of said object.

10. An apparatus for determining the optical parameters of a phase object, comprising:

A source for producing diffuse light;

First and second gratings capable of producing a moiré pattern, wherein said gratings are placed in the space between said light source and the position intended for said phase object, and the plane of said first grating is parallel to the plane of said second grating; and Means for recording the moiré pattern viewed through said phase object.

11. An apparatus according to claim 10, wherein the first and second gratings have different periodicities.

12. An apparatus according to claim 10, wherein the first and second gratings are provided in the form of first and second grids, respectively, wherein each grid is obtained by overlapping two identical sets of equidistant parallel lines at an angle of 90°.

13. An apparatus according to claim 10, wherein the gratings are angularly oriented with respect to each other.

14. An apparatus according to claim 10, further comprising a transparent support for placing the tested phase object thereon.

15. An apparatus according to claim 10, further comprising filter means coupled to the source of diffuse light, to allow the transmission of a preselected wavelength λ.

16. An apparatus according to claim 15, wherein the two gratings are separated from each other by a distance d, given by $d=n \cdot p_1 p_2/\lambda (n=1,2,3 \ldots)$, wherein $p_1$ and $p_2$ indicate the periodicity of the first and second gratings, respectively.

17. An apparatus according to claim 10, further comprising means positioned between the light source and the first grating, for uniformly projecting the diffuse light into the space between said light source and the phase object.

18. An apparatus according to claim 10, wherein the means for recording the moiré pattern includes a camera positioned at a predetermined distance from the gratings.

* * * * *